United States Patent [19]

Werner et al.

[11] Patent Number: 4,523,382

[45] Date of Patent: Jun. 18, 1985

[54] WORK-CONTACT PROBE HEAD FOR COORDINATE-MEASURING INSTRUMENTS

[75] Inventors: Walter Werner, Konigsbronn; Klaus Herzog, Oberkochen; Franz Szenger, Konigsbronn, all of Fed. Rep. of Germany

[73] Assignee: Carl-Zeiss-Stiftung, Heidenheim, Fed. Rep. of Germany

[21] Appl. No.: 480,822

[22] Filed: Mar. 31, 1983

[30] Foreign Application Priority Data

Apr. 29, 1982 [DE] Fed. Rep. of Germany ....... 3215878

[51] Int. Cl.³ .............................................. G01B 7/02
[52] U.S. Cl. ..................................... 33/169 R; 33/561; 33/172 E
[58] Field of Search ............. 33/169 R, 174 L, 172 E, 33/172 D, 169 C, 23 K; 409/125, 126, 127, 128

[56] References Cited

U.S. PATENT DOCUMENTS 2,858,071 10/1958 Stokes .............................. 409/126 X
4,136,458 1/1979 Bell et al. .......................... 33/174 L
4,177,568 12/1979 Werner ............................. 33/174 L
4,397,093 8/1983 McMurtry ..................... 33/169 R X

*Primary Examiner*—Harry N. Haroian
*Attorney, Agent, or Firm*—Hopgood, Calimafde, Kalil, Blaustein & Judlowe

[57] ABSTRACT

The invention contemplates a so-called switching probe head in which the movable element of the probe has a tensed at-rest position on support structure which determines its zero position and from which it is displaced upon work contact.

To increase the accuracy by which the zero position of the probe element (2, 4) is reproduced, the probe element is suspended, without friction, from a housing part (1) of the probe head, via at least three filaments (5a, b, c), wires or flexible strips. For torsionally rigid centering of the probe element, friction-free wire or strip arrangements are also usable; and torsional-rigid alternatives include use of a bellows (3) or of balls having rolling contact with opposing walls of centering grooves.

20 Claims, 9 Drawing Figures

WORK-CONTACT PROBE HEAD FOR COORDINATE-MEASURING INSTRUMENTS

BACKGROUND OF THE INVENTION

The present invention relates to a work-contact probe head wherein a probe member is forced by restoring forces into a support which determines its zero position, from which support it is displaceable relative to its mount in one direction in space and can be tilted in all directions with respect to this direction of displacement.

Such probe heads are described, for example, in West German Pat. No. 2,347,633 or West German Offenlegungsschrift OS No. 2,743,665, and are used in coordinate measuring instruments, preferably multi-coordinate measuring instruments; and they serve to produce a signal when the probe element, i.e., the movable part of the probe head, contacts the workpiece which is to be measured.

To produce this signal, switch elements are frequently integrated into a support which determines and references the zero position of the probe element, and the switch elements respond upon deflection of the probe element out of its support-referenced position. Other probes are also known, for example, from West German Pat. No. 2,712,181, in which production of the signal is independent of probe-element deflection and in which, therefore, the support which determines the zero position serves merely as a flexible knee point to prevent the probe element from being deformed during the course of a work-probing procedure.

In all cases, precision of the probe head used for the coordinate measurement depends on how well the zero position of the probe element is reproduced upon return into its support after each work-contacting procedure.

In the above-mentioned known probe heads, the support consists of self-centering three-point abutments fixed to the housing of the probe head, the probe element being spring-urged into contact with the abutments. To enable probe-element displacement in all six directions in space, the probe element is frequently indirectly mounted on an intermediate ring, and the latter in turn is mounted (via another three-point reference abutment) to the part which is fixed to the housing; the intermediate ring is preloaded against the housing reference by a spring force which is in the direction opposite to the direction of resiliently urging the probe element to its referencing engagement with the intermediate ring.

The involved three-point supports provide V-shaped depressions into which balls or cylinders have sliding engagement. The sliding friction which characterizes these supports is not negligible; it impedes return of the probe element into its precise zero position and therefore limits the measurement precision of coordinate measuring instruments which are thus equipped.

This friction problem is also present in the case of the probe head described in West German Pat. No. 2,365,984, wherein the probe element comes to rest on a simple three-point support which is not self-centering and which has separate means for centering the probe element and for assuring against torque about the longitudinal axis of the probe element. The probe head described in West German Offenlegungsschrift OS No. 2,248,967, wherein the probe element is centered by a plurality of tensed wires, is also characterized by relatively great friction in the at-rest or zero position, since the probe element comes to rest on a part fixed to the housing via an annular resting surface.

BRIEF STATEMENT OF THE INVENTION

The object of the present invention is to provide a probe head of the aforementioned type which provides substantially friction-free mounting of its probe element and which is of relatively simple construction.

The invention achieves this object in a probe head wherein, in the at-rest or zero position, the probe element (a) is suspended friction-free via at least three spaced flexible filaments or strips which extend in the direction of Z-axis displacement and (b) is stabilized by means of a torsionally-rigid centering device.

The probe of the invention is characterized by much better reproducibility of the zero position of the probe element, as a result of the friction-free suspension on filaments in the direction of displacement. Such a filament or flexible strip suspension is furthermore easier to manufacture than a self-centering three-point abutment support since ordinary commercially available parts can be used for the suspension, as distinguished from the known three-point devices which must be specially treated for minimal friction.

The torsionally rigid centering device can also be of simple construction; in the simplest case, it uses but two filaments or flexible strips. Other advantageous alternative means for a friction-free torsionally-rigid centering of the probe element employ diaphragm springs or bellows, to which the stem of the probe element is mounted.

It is also possible to effect the centering of the probre element via balls having rolling contact in grooves along the direction of displacement. Although this arrangement is not entirely free of friction, it nevertheless affords advantages with respect to the precision of return of the probe element, in that rolling friction represents a substantial reduction as compared with the sliding friction of the prior art. This rolling-contact arrangement is furthermore well adapted to both vertically suspended and horizontal operation of the probe head since the weight of the probe, including the probe combination carried thereby, is sustained by at least one of the balls.

When using a flexible-strip probe-element suspension, for example using flexible strips of steel, it is advisable to install them with a twist of about 90° between their points of attachment. In this way assurance is had that, for any and all movement associated with work-contact, the strips will yield in the direction of their highly flexible broad side. It is also advantageous to install each strip as a "package" of a plurality of individual strips separated by spacers of small thickness, in order to optimize the ratio of load-carrying capacity to flexibility.

DETAILED DESCRIPTION

The invention will be described in detail for several illustrative embodiments, all in conjunction with the accompanying drawings, in which.

Figure 1:
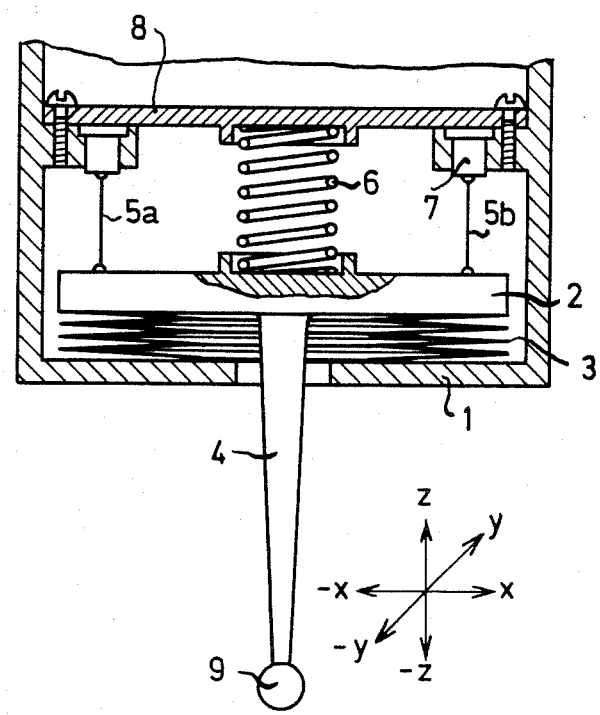
FIG. 1 is a longitudinal section through a first embodiment of a probe head, with its probe element shown in its at-rest position.
Figure 2:
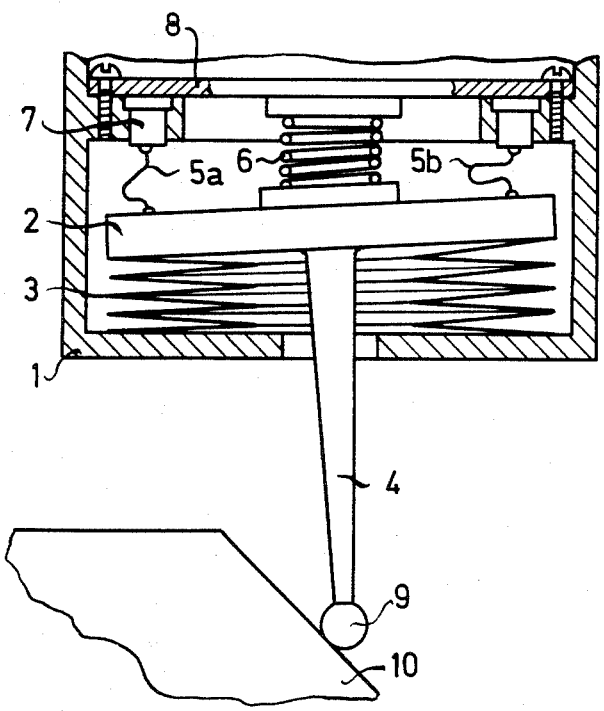
FIG. 2 is a similar section to show the probe element of FIG. 1 in a deflected position.

The work-contacting probe head in FIGS. 1 and 2 comprises a cylindrical housing 1 in which a cylindrical plate 2 mounts a probe element or pin 4, having a work-contacting ball 9 at the projecting end of its stem; plate 2 is suspended from housing 1, on three steel wires 5a–c. The steel wires, which are at 120° spacing on a circle locus concentric with the axis of probe pin 4 (in the at-rest position of FIG. 1) and are tensed by a compression spring 6 referenced at a plate 8 which closes the machine side of housing 1. Piezoelectric sensors 7 are integrated into the suspension points of the wires 5; they provide an electric-signal output upon a reduction in tension of wires 5a–c, namely, in the course of the probing process (FIG. 2), when probe ball 9 is in contact with the workpiece 10.

To center the probe pin 4 and retain it against torsional displacement, a bellows 3 is secured between plate 2, which mounts the probe pin, and that part of the housing 1 which substantially closes the work-contacting side, said bellows being compressed by spring 6 to the extent that the surfaces of the folds of the bellows 3 are close to but not in contact with each other. The cushion of air remaining between the surfaces of the folds will be understood to dampen the movement of the probe element upon return to its at-rest position, which determines the zero point of the probe.

Figure 3:
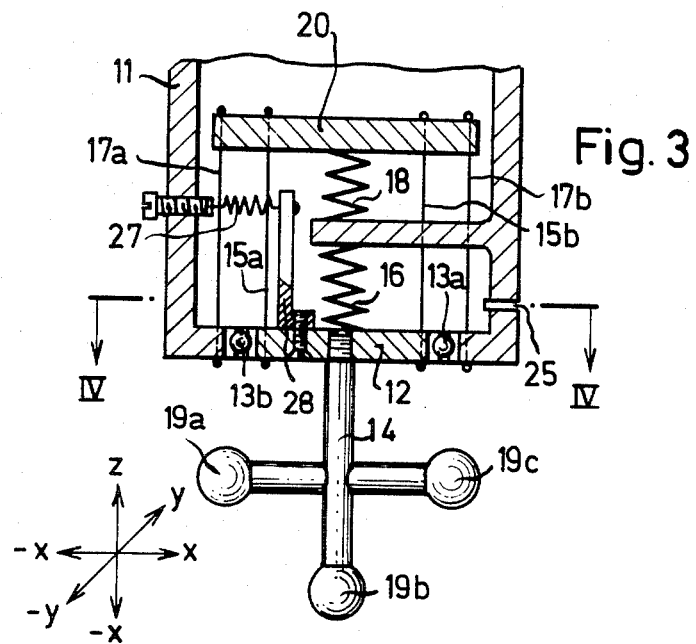
FIG. 3 is a longitudinal section through a second probe-head embodiment.
Figure 4:
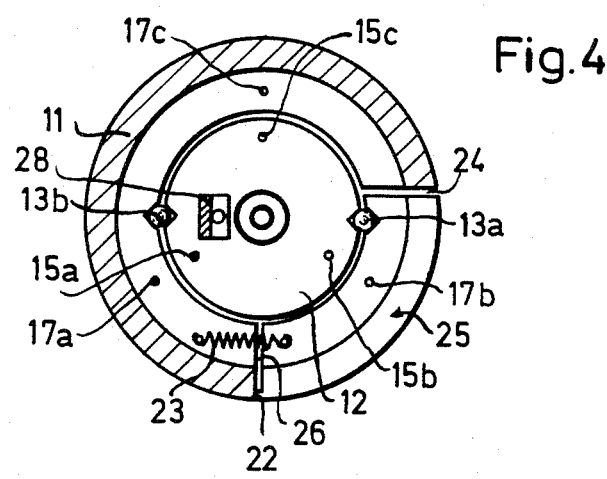
FIG. 4 is another sectional view through the embodiment of FIG. 3, along the line IV—IV of FIG. 3.

The probe shown in FIGS. 3 and 4 is of a construction similar to that of FIGS. 1 and 2, in that it comprises a housing 11 within which a plate 12 is suspended from three filaments 15a–c. The stem 14 of a star-shaped probe-pin combination, having probe balls 19a, b and c, is mounted to and projects from plate 12.

In contrast to FIGS. 1 and 2, the plate 12 of FIGS. 3 and 4 is not suspended directly from housing 11 but, rather, from an intermediate member 20 which in turn is restrained by three filaments 17a–c. Compression springs 16 and 18 are referenced to an arm forming part of housing 11 and stress filaments 15 and 17 in tension, to thereby define the zero position of probe balls 19a–c, with respect to the Z direction of displacement, which coincides with the longitudinal axis of the probe.

The probe-element plate 12 and thus the stem 14 of the probe element are centered by two balls 13a and 13b in a plane normal to the at-rest longitudinal axis of the probe-pin stem 14 and are retained against torsional displacement about this axis. For this purpose, each of the balls 13a and 13b is captive in a cage formed by facing V-shaped grooves in housing 11 and in the plate 12; each of these balls has rolling contact with the walls of its cage, upon a tilting or a Z-displacement of the probe-element plate 12.

To avoid jamming of balls 13 at large angles of tilt of the probe pin or stem, the part 25 of the housing 11 containing the groove for the ball 13a is developed, by reason of slit 24 (as well as a radially limited slit 26), as a lever arm which is flexibly movable about a fulcrum at locally shallow remaining web 22; said arm is inwardly urged by a tension spring 23 in the direction of plate 12, thereby resiliently loading both balls 13a and 13b for rolling contact with their grooves at all times.

In the described construction of FIGS. 3 and 4, balls 19a–c of the probe element are movable in all six directions of space, namely, +X, −X; +Y, −Y, +Z, −Z. On the other hand, the probe described in FIGS. 1 and 2 is movable only in the five directions ±X, ±Y, +Z; however, it will be understood that the probe of FIGS. 1 and 2 can be expanded for probing in −Z direction if the probe pin 4 is suspended indirectly via an intermediate member, as in the manner shown for intermediate member 20 in FIGS. 3 to 4. In the latter event, no direct centering of probe pin 4 with respect to the housing 1 of FIGS. 1 and 2 is possible; the centering must rather be effected indirectly, via the intermediate member to which then two bellows, arranged concentrically to each other, are so connected that one bellows connects the housing to the intermediate member, and the other bellows connects the probe-element plate 2 to the intermediate member.

The probe element of FIGS. 3 and 4 is well suited for horizontal operation, wherein the longitudinal axis of the probe stem 14 lies in the X, Y plane (see axis diagram associated with FIG. 3) since the weight of the probe element can be sustained by balls 13a and 13b, as loaded by spring 23. To effect tilting moments of the probe pin 14 in the course of such horizontal operation, an adjustable tension spring 27 applies balancing force between housing 11 and an arm 28 fixed to plate 12.

Figure 5:
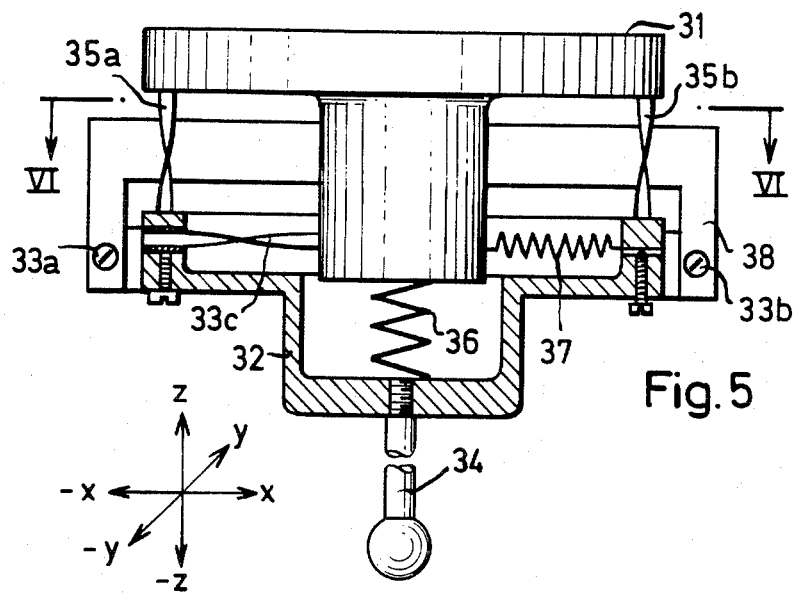
FIG. 5 is a longitudinal sectional through a third probe-head embodiment, the section being on the alignment V—V of FIG. 6.
Figure 6:
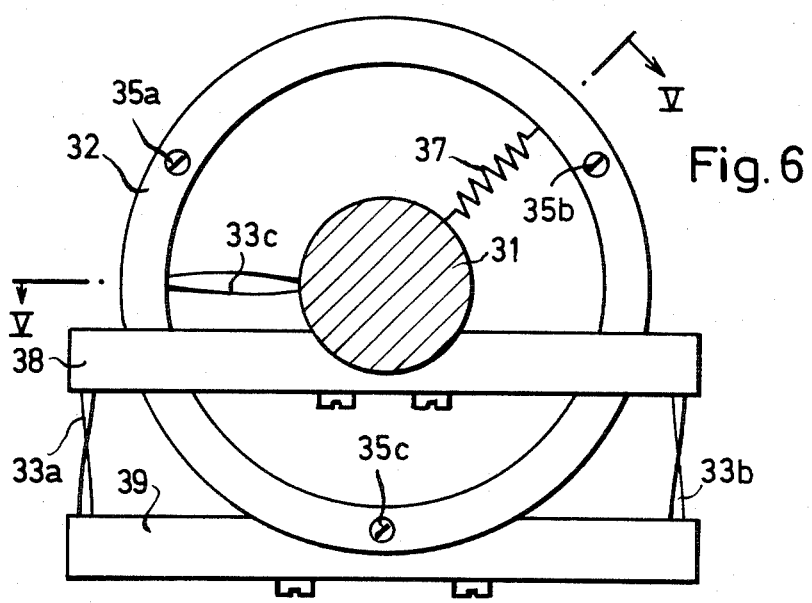
FIG. 6 is another sectional view through the embodiment of FIG. 5, along the line VI—VI of FIG. 5.

FIGS. 5 and 6 show another embodiment of a work-contacting probe in which a movable part 32 which mounts a probe pin 34 is not only suspended in the Z-direction of displacement (on flexible strips 35a, b and c which are tensioned by the spring 36) but is also centered by three additional flexible strips 33a, b, c, in a plane normal to the displacement direction and is secured against torsional displacement.

To obtain the high torsional rigidity necessary for operation with a probe ball which contacts a work surface at offset from the longitudinal axis of the probe stem, the flexible strips 33a and 33b are tensioned between two bars 38 and 39; one (38) of these bars is rigidly secured to a cylindrical part 31 fixed to the housing, and the other (39) of these bars is rigidly secured to the movable part 32. The bars 38–39 separate the points of attachment of strips 33a and 33b as much as possible, so as to widen the base. The strip 33c serves for centering in the X-direction; the three strips 33a, b and c are jointly tensioned by a spring 37 which is installed to apply torsion force at an angle to all three of these strips.

Figure 7:
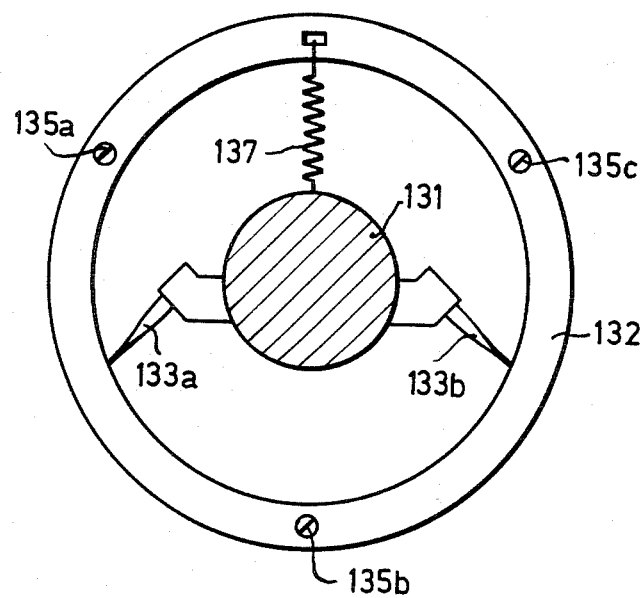
FIG. 7 is a cross-section through a fourth probe-head embodiment which is slightly modified as compared with the embodiment of FIGS. 5 and 6, the section being in a plane perpendicular to the longitudinal axis of the probe element.

The construction of the probe shown in FIGS. 5 and 6 can be simplified, with a minor concession as to torsional rigidity if, instead of three centering strips 33a, b and c, two strips 133a and 133b are used in the arrangement sketched in FIG. 7. The strips 133a and 133b are inclined to each other, and geometric projections of their respective alignments intersect at a point which is eccentric to the longitudinal axis of the probe head.

Strips 133a and 113b are tensed by a spring 137, applying tensile force in the direction of the bisector of the angle subtended by the respective alignments of the bands 133a and 133b.

Figure 9:
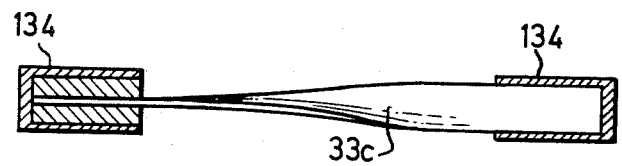
FIG. 9 is an enlarged and more detailed showing of flexible strips used for probe-element suspension in the embodiments of FIGS. 5 to 7.

FIG. 9 illustrates, for the case of strip 33c (taken by way of example), that ends of the strips are secured in cylindrical sleeves 134, as by soldering. These sleeves are received in the corresponding boreholes, in that part of the probe which is to be suspended and, after tensioning and twisting to the desired extent, are securely clamped by a screw. The angle of twist is about 90°, assurance thus being had that the strips can bend easily in all directions.

It is readily possible to hold corresponding ends of several strips in each of the sleeves 134 (rather than a single strip 33c, as shown), thereby increasing the carrying capacity of the suspension without changing the elasticity. To avoid friction between such multiple adjacent strips, it is then advisable to insert spacers between the individual strips in the vicinity of sleeve connection.

Figure 8:
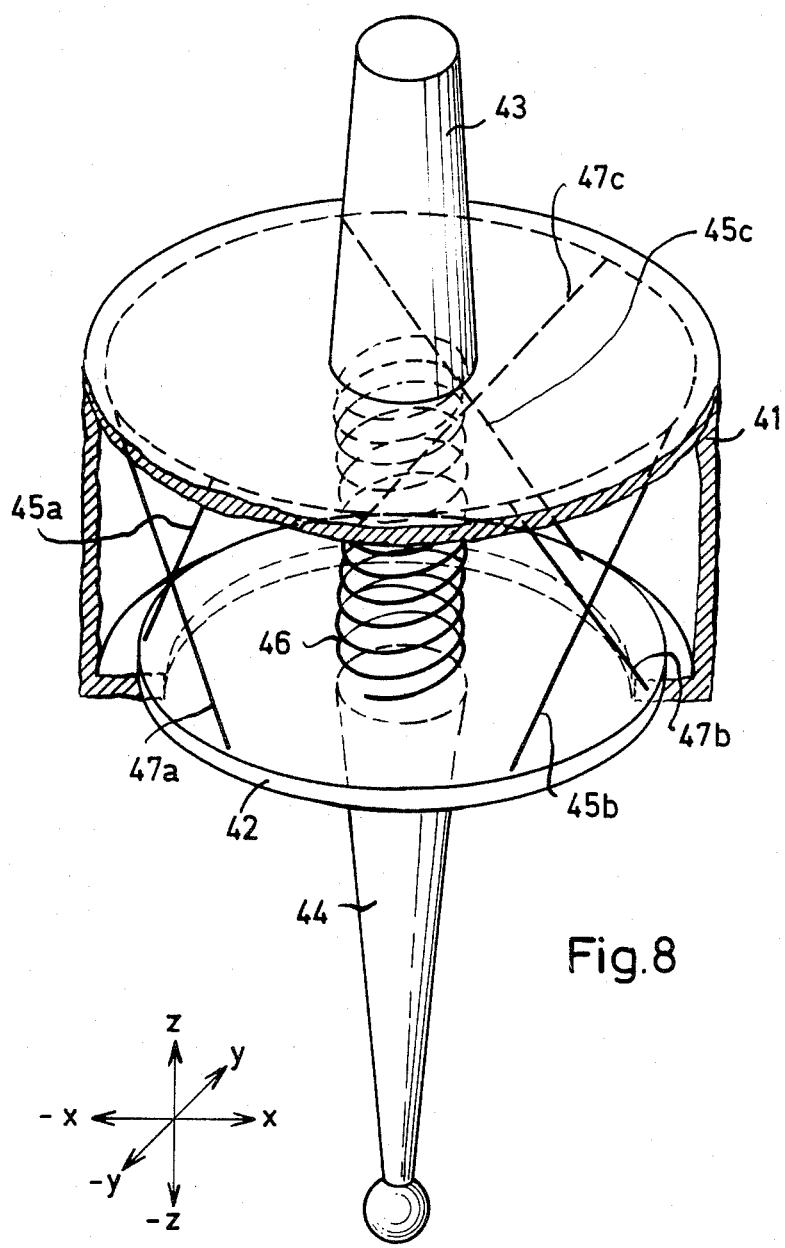
FIG. 8 is a perspective view, partly broken-away and in section, to show a fifth embodiment of the invention.

The work-contacting probe of FIG. 8 is of particularly simple, symmetrical construction. A movable plate 42 which mounts a probe pin 44 is suspeneded from a housing part 41, which is provided with a mounting cone 43 at the machine end of the housing. Six steel wires provide the suspension and are tensed by a central spring 46. The steel wires are arranged in two groups, 45a, b and c and 47a, b and c of three wires each, the groups being skewed in opposite directions about the axis of the probe pin. In each case, two wires 45a, 47a and 45b, as well as 45c and 47c, from the respective groups will be understood to cross each other without, however, touching one another. Since the points of connection of wires 45 and 47 to the plate 42 are closer to each other than the points of their connection to the housing part 41, the wires 45 and 47 lie approximately on the surface of a conical frustum.

Due to the oppositely skewed or criss-crossed arrangement of the wires, at each of three angularly spaced locations about the probe axis, a self-centering mount of great torsional rigidity is obtained for probe pin 34, and the centering action is further enhanced by the conical locus of inclination of wires 45 and 47, with respect to the axis of the probe pin. It will be understood that the probe of FIG. 8 may be made very compact and with small dimensions, without impairing accessibility of all the suspension points of the wires 45 and 47, which may be peripherally accessible via outer surfaces of plate 42 and the closed end of housing part 41.

It will be further understood that, if desired, the probe of FIG. 8 may be modified to incorporate ±Z-direction displacements, using the technique described in connection with FIGS. 3 and 4, namely, by supporting the probe pin 44 indirectly via an intermediate member, thereby rendering the probe movable in all six directions in space. In such case, the intermediate member can be suspended from the housing via six wires which cross each other in pairs, and the probe-element plate 42 can similarly be suspended from the intermediate member via six further wires which cross each other in pairs.

The probe head of FIG. 8 as well as the embodiments of FIGS. 3 to 7 desirably include sensors which provide a characteristic output signal upon probe-ball contact with a workpiece. For this purpose, piezoelectric elements may be employed as described in FIGS. 1 and 2, such elements being arranged at the suspension points of the wires or strips, or they may be integrated at a suitable place into the movable pin-mounting part of the probe head. Such arrangements are known, for example, from West German Pat. No. 2,712,181.

What is claimed is:

1. A probe head for use in making work-contacting coordinate measurements, comprising a cylindrical housing having an opening at one end and a base-reference member within said housing and spaced from and facing said open end, an elongate probe element having a work-contacting end and a circular base plate at its other end, said base plate being received with clearance in the housing with the work-contacting end of said probe projecting outwardly beyond said open end, at least three substantially parallel flexible tension wires fixed at one end at equal angular spacing with respect to said base-reference member and fixed at the other end at equal angular spacing with respect to said base plate, yieldable loading means continuously reacting axially between said base-reference member and said base plate and placing said wires in tension, and torsion-resistant axially compliant means establishing a probe-centering connection between said housing and said base plate, whereby in the absence of work contact, said probe extends and is displaceable in one direction (Z) relative to said base-reference member and can be tilted in all directions away from said one direction.

2. A probe head for use in making work-contacting coordinate measurements, comprising a cylindrical housing having an opening at one end and a base-reference member within said housing and spaced from and facing said open end, an elongate probe element having a work-contacting end and a circular base plate at its other end, said base plate being received with clearance in the housing with the work-contacting end of said probe projecting outwardly beyond said open end, at least three substantially parallel flexible tension strips fixed at one end at equal angular spacing with respect to said base-reference member and fixed at the other end at equal angular spacing with respect to said base plate, yieldable loading means continuously reacting axially between said base-reference member and said base plate and placing said strips in tension, and torsion-resistant axially compliant means establishing a probe-centering connection between said housing and said base plate, whereby in the absence of work contact, said probe extends and is displaceable in one direction (Z) relative to said base-reference member and can be tilted in all directions away from said one direction.

3. A probe head according to claim 1 or claim 2, in which said wires or strips are of steel.

4. A probe head according to claim 2, in which said strips are twisted.

5. A probe head according to claim 1 or claim 2, characterized by the fact that said torsion-resistant axially compliant means comprises at least two additional wires or strips (33a–c; 133a, b) which are arranged substantially in a plane normal to said one direction of displacement (Z).

6. A probe head according to claim 1 or claim 2, characterized by the fact that said torsion-resistant axially compliant means comprises at least two additional wires or strips (33a–c; 133a, b) which are arranged substantially in a plane normal to said one direction of displacement (Z), and further characterized by the fact that said additional wires or strips (33; 133) are jointly tensed by a single spring (37; 137).

7. A probe head according to claim 1 or claim 2, characterized by the fact that said torsion-resistant axially compliant means comprises movable balls (13a, 13b) which are arranged under initial stress between facing angularly spaced pairs of longitudinal grooves extending in said one direction of displacement (Z), one groove of each pair being in a portion of said housing and the other groove of each pair being in a part (12) of said probe.

8. A probe head according to claim 1 or claim 2, characterized by the fact that said torsion-resistant axially compliant means comprises movable balls (13a, 13b) which are arranged under initial stress between facing angularly spaced pairs of longitudinal grooves extending in said one direction of displacement (Z), one groove of each pair being in a portion of said housing and the other groove of each pair being in a part (12) of said probe, and further characterized by the fact that said pairs of grooves are in diametrically opposed locations on opposite sides of the probe element.

9. A probe head according to claim 1 or claim 2, characterized by the fact that said torsion-resistant axially compliant means comprises at least one folded bellows (3) or a diaphragm spring which connects the probe element to the housing.

10. A probe head according to claim 1 or claim 2, characterized by the fact that said torsion-resistant axially compliant means comprises at least one folded bellows (3) or a diaphragm spring which connects the probe element to the housing, and further characterized by arrangement of the folded bellows (3) in such manner that a thin air cushion remains between the surfaces of the folds of the bellows (3) in the at-rest position of the probe element.

11. A probe head according to claim 1 or claim 2, characterized by the fact that said probe element (42, 44) is suspended from at least six tensed wires, (45a–c, 47a–c) or flexible strips which are arranged in two groups (45, 47) which are skewed in opposite directions about said one direction of displacement (Z).

12. A probe head according to claim 1 or claim 2, characterized by the fact that the tensed wires or strips are arranged approximately on the surface of a cylinder or conical frustum the axis of which coincides with said one direction of displacement (Z).

13. A probe head according to claim 4, characterized by the fact that said flexible strips are twisted by about 90° between their corresponding points of attachment.

14. A probe head according to claim 2 or claim 13, characterized by the fact that each flexible strip consists of a plurality of individual strips separated by spacers of slight thickness.

15. A probe head according to claim 2 or claim 13, characterized by the fact that the filaments or strips (33, 34; 133, 135) of the suspension have their ends clamped in sleeves (134) which are fastened in adjustment holes within the housing and in the probe element, respectively.

16. A probe head according to claim 1 or claim 2, characterized by the fact that said probe element (12, 14) is tension-suspended indirectly from an intermediate member (20) which in turn is tension-suspended from said housing (11), said yieldable loading means reacting in one axial direction between said base plate and said intermediate member, and said yieldable loading means reacting in the opposite axial direction between said base-reference member and said intermediate member.

17. A probe head according to claim 1 or claim 2, characterized by an adjustable spring (27) to compensate for the weight of the probe element in the event of horizontally oriented operation of the probe head.

18. A probe head according to claim 1 or claim 2, characterized by the fact that stress-sensitive sensors (7) are arranged in the vicinity of the points of suspension of the wires or strips.

19. A probe head for use in making work-contacting coordinate measurements, comprising a housing having an opening at one end and a base-reference member within said housing and spaced from and facing said open end, an elongate probe element having a work-contacting end and a base plate at its other end, said base plate being received with clearance in the housing with the work-contacting end of said probe projecting outwardly beyond said open end, at least three substantially parallel flexible tension wires fixed at one end to said base-reference member at equal angular spacing about a central probe-stabilizing axis and fixed at the other end to said base plate at equal angular spacing about said axis, yieldable loading means continuously reacting axially between said base-reference member and said base plate and placing said wires in tension, and torsion-resistant axially compliant means establishing a probe-centering connection between said housing and said base plate, whereby in the absence of work contact, said probe is stabilized to said axis and, upon work contact, is displaceable in the direction of said axis relative to said base-reference member and can be tilted in all directions away from said direction.

20. A probe head for use in making work-contacting coordinate measurements, comprising a housing having an opening at one end and a base-reference member within said housing and spaced from and facing said open end, an elongate probe element having a work-contacting end and a base plate at its other end, said base plate being received with clearance in the housing with the work-contacting end of said probe projecting outwardly beyond said open end, at least three substantially parallel flexible tension strips fixed at one end to said base-reference member at equal angular spacing about a central probe-stabilizing axis and fixed at the other end to said base plate at equal angular spacing about said axis, yieldable loading means continuously reacting axially between said base-reference member and said base plate and placing said strips in tension, and torsion-resistant axially compliant means establishing a probe-centering connection between said housing and said base plate, whereby in the absence of work contact, said probe is stabilized to said axis and, upon work contact, is displaceable in the direction of said axis relative to said base-reference member and can be tilted in all directions away from said direction.

* * * * *